US005881859A

United States Patent [19]

Bianchi

[11] Patent Number: 5,881,859

[45] Date of Patent: Mar. 16, 1999

[54] ESCALATOR HANDRAIL DRIVE MECHANISM

[76] Inventor: James N. Bianchi, 13035 Telegraph Rd. (rear), Santa Fe Springs, Calif. 90670

[21] Appl. No.: 728,828

[22] Filed: Oct. 10, 1996

[51] Int. Cl.[6] ........ B65G 23/12

[52] U.S. Cl. ........ 198/335

[58] Field of Search ........ 198/335

[56] References Cited

U.S. PATENT DOCUMENTS

| | | | |
|---|---|---|---|
| 3,414,109 | 12/1968 | Clark . | |
| 3,653,484 | 4/1972 | Taylor . | |
| 3,779,360 | 12/1973 | Taher et al. | 198/335 |
| 4,875,568 | 10/1989 | Hermann et al. . | |
| 4,895,240 | 1/1990 | Bruehl et al. . | |
| 5,117,960 | 6/1992 | Ahls et al. | 198/335 |
| 5,125,494 | 6/1992 | Nurnberg et al. . | |
| 5,307,920 | 5/1994 | Meyer et al. . | |
| 5,341,909 | 8/1994 | Ahls et al. . | |

FOREIGN PATENT DOCUMENTS

| | | | |
|---|---|---|---|
| 1267392 | 5/1968 | Germany | 198/335 |
| 4301512A1 | 8/1993 | Germany . | |

*Primary Examiner*—William E. Terrell
*Assistant Examiner*—Mark Deuble
*Attorney, Agent, or Firm*—Joseph E. Mueth

[57] ABSTRACT

A device for transporting persons between spaced landings using pairs of drive rollers, preferably gears, having a flexible belt loop therebetween made to abut the handrail to move the handrail. Springs and idler gear can be used to maintain the abutting relationship. The drive rollers are carried by shafts mounted on bearings bolted to the fixed supporting structure.

3 Claims, 5 Drawing Sheets

ESCALATOR HANDRAIL DRIVE MECHANISM

BACKGROUND OF INVENTION

This invention relates to a novel escalator or moving sidewalk hand rail drive mechanism.

Various escalator and moving walks structures have been described in the prior art.

Taylor, U.S. Pat. No. 3,653,484 relates to a handrail driving assembly for belt type moving passenger conveyors in which a plurality of traction providing rollers are disposed along the length of the conveyor to operate independently of each other, each deriving its motive power from the motion of the belt.

Clark, U.S. Pat. No. 3,414,109 describes the return run of a moving handrail engages a plurality of successive traction rollers, each provided with a pressure roller. A cantilever mounting of rollers provides accessibility. A coil spring mechanism is used to keep the handrail in contact with the traction rollers.

Taher et al., U.S. Pat. No. 3,779,360 pertains to a transportation device having an endless handrail driven about a closed loop by drive means which include traction and pressure rollers. The pressure rollers are biased against the handrail, opposite the traction rollers, by biasing means which includes at least one main leaf spring member. A leaf spring member is stressed from a predetermined unstressed curved configuration to a flat configuration when the handrail is disposed between the traction and pressure rollers.

Meyer et al., U.S. Pat. No. 5,307,920 discloses an escalator handrail drive system which includes a powered drive belt engaging the underneath surface of the handrail along the return path of travel of the latter. A series of pressure rollers engage the outer surface of the handrail to press the latter against the drive belt. The pressure rollers are all biased against the handrail by a single tensioning spring. The drive belt is pretensioned by an adjustable pretension spring assembly which can apply a fixed pretensioning force to the drive belt which will not substantially change irrespective of whether the handrail is being driven in the "up" direction or in the "down" direction on the escalator.

Ahls et al., U.S. Pat. No. 5,117,960 discusses an escalator or moving walkway handrail driven by a pair of linear belts which engage opposite sides of the handrail along the return path of travel thereof. The belt that engages the underside of the handrail is a powered drive belt, and the belt that engages the upper-side of the handrail is a pressure or reaction belt. Both belts are held against the handrail by a set of biased pressure rollers which urge the reaction belt against the handrail. The belts serve to convert line contact with the pressure rollers into area contact with the handrail thereby spreading out the driving forces acting upon the handrail. Ahls et al., 5,341,909 describes a direct drive wheel to handrail contact drive assembly utilizes a pair of drive rollers which contact the handrail directly. The drive rollers are powered by a single drive shaft. A pair of pressure rollers oppose the drive rollers so as to press the handrail against the drive rollers. The pressure rollers are spring biased against the handrail. The drive assembly is used to drive the handrail of an escalator or moving walkway.

Nurnberg et al., U.S. Pat. No. 5,125,494 relates to a drive pulley system provided for a handrail drive mechanism of a passenger conveyor. The system includes a pulley, with a handrail drive belt wrapped about the pulley for rotation therewith. A pair of disc-like members are disposed on opposite sides of the pulley to sandwich the pulley therebetween. The disc-like members have diameters greater than that of the pulley and are rotatable relative to the pulley, or the disc-like members may be fixed to the pulley and be fabricated of low friction material. The handrail is wrapped about the outer peripheries of the disc-like members, spacing the handrail from the drive belt, and thereby allowing differential linear movement between the handrail drive belt and the handrail due to the relative rotation between the disc-like members and the pulley, or due to slippage between the handrail and the low friction disc-like members. The system also includes an idler pulley disposed in an area between the pulley and a second pulley and about which both the handrail drive belt and the handrail drive are wrapped to impart drive to the handrail by the drive belt. The idler pulley substantially spans the area between the other two pulleys to provide a large included angle of engagement between the idler pulley, the handrail and the handrail drive belt.

Bruehl et al., U.S. Pat. No. 4,895,240 pertains to the handrail of an escalator of other passenger conveyor is driven by traction rollers which engage the handrail and also directly engage links which are connected to and drive the steps or tread of the conveyor. The handrail is biased into engagement with the traction rollers, and moves at substantially precisely the same speed as the steps or tread due to the direct connection between the step or tread drive and the handrail drive.

Hermann et al., U.S. Pat. No. 4,875,568 refers to an escalator handrail is driven by a pair or angularly offset rollers. The angular offset of the rollers causes a wedging effect at a roller nip whereby the driving force imparted by the rollers to the handrail is increased. Hermann et al discloses a spring tensioning arrangement.

German Patent Document No. 4301512A1 relates to a three-state planetary reduction gearbox for driving a coaxial handrail pulley for an escalator in which a bearing housing is bolted in the handrail drive.

The problem with prior are devices is that the handrails tend to slip with respect to the foot pieces or passenger load run which requires the passenger to release his or her grip from the handrail from time-to-time to avoid being dragged forward or backward of the place on which they are standing. The relative displacement of the handrail vis-a-vis the foot pieces can result in accidents including falls which has lead to increasing liability insurance costs. The slippage of the handrail is due to slippage in the handrail drive mechanism. The present invention presents a solution to this problem by providing a mechanism to maintain synchronous movement between the handrail and the foot pieces.

SUMMARY OF INVENTION

In a device for transporting persons between spaced landings, an upper load run on which passengers stand and a lower return load run, an endless, flexible handrail, a supporting structure for guiding the handrail in a closed elongated loop, said handrail having an upper run with an outer surface to be grasped by persons to operate as a balustrade and a low return run, and driving means for applying a separate force between the handrail and the structure acting substantially in the same direction at each of a plurality of points spaced between the ends of the loop along the return run of the handrail in the direction of movement of the return run;

the improvement wherein said driving means comprises a plurality of pairs of drive rollers spaced along the return run each of said pairs of drive rollers having a flexible belt loop running therebetween, means mounting each of said rollers relative to the structure for rotation about a separate axis extending transverse to the direction of movement of the handrail, each said flexible belt loops having a portion of its periphery positioned for flush engagement with a first surface of the handrail, means biasing the opposite surface of the handrail to urge the handrail against the flexible belt loop, and coupling means mechanically coupling the drive rollers together for rotation, said coupling means including driving means coupled to at least one of said drive rollers for rotating the pairs of drive rollers to move the handrail.

In one preferred form, the invention comprises in a device for transporting persons between spaced landings, an upper load run on which passengers stand and a lower return load run, an endless, flexible handrail, a supporting structure for guiding the handrail in a closed elongated loop, said handrail having an upper run with an outer surface to be grasped by persons to operate as a balustrade and a low return run, and driving means for applying a separate force between the handrail and the structure acting substantially in the same direction at each of a plurality of points spaced between the ends of the loop along the return run of the handrail in the direction of movement of the return run;

the improvement wherein said driving means comprises a plurality of pairs of drive rollers spaced along the return run each of said pairs of drive rollers having a flexible belt loop running therebetween, means mounting each of said rollers relative to the structure for rotation about a separate axis extending transverse to the direction of movement of the handrail, each said flexible belt loops having a portion of its periphery positioned for flush engagement with a first surface of the handrail, means biasing the opposite surface of the handrail to urge the handrail against the flexible belt loop, said means biasing comprising a leaf spring which depends from said structure, said leaf spring having free ends, each of which carry a pallet roller which maintain pressure against the surface of said handrail and prevents slippage between the handrail and the drive rollers, and coupling means mechanically coupling the drive rollers together for rotation, said coupling means including driving means coupled to at least one of said drive rollers for rotating the pairs of drive rollers to move the handrail.

In another form, the invention comprehends in a device for transporting persons between spaced landings, an upper load run on which passengers stand and a lower return load run, an endless, flexible handrail, a supporting structure for guiding the handrail in a closed elongated loop, said handrail having an upper run with an outer surface to be grasped by persons to operate as a balustrade and a low return run, and driving means for applying a separate force between the handrail and the structure acting substantially in the same direction at each of a plurality of points spaced between the ends of the loop along the return run of the handrail in the direction of movement of the return run;

the improvement wherein said driving means comprises a plurality of pairs of drive rollers spaced along the return run each of said pairs of drive rollers having a flexible belt loop running therebetween, means mounting each of said rollers relative to the structure for rotation about a separate axis extending transverse to the direction of movement of the handrail, each said flexible belt loops having a portion of its periphery positioned for flush engagement with a first surface of the handrail, means biasing the opposite surface of the handrail to urge the handrail against the flexible belt loop, there being provided between each of the drive rollers forming a pair, a rotatable idler gear to keep pressure between said flexible belt loop and said handrail to prevent slippage between the handrail and the drive rollers, and coupling means mechanically coupling the drive rollers together for rotation, said coupling means including driving means coupled to at least one of said drive rollers for rotating the pairs of drive rollers to move the handrail.

It is an object of this invention to provide a novel handrail mechanism for escalators and moving sidewalks.

It is a further specific object of this invention to provide for means to prevent relative displacement between the handrails and the footpieces.

These and other objects of this invention will be apparent from the detailed description which follows.

DESCRIPTION OF THE DRAWINGS

Turning to the drawings.

DESCRIPTION OF PREFERRED EMBODIMENTS

Figure 1:
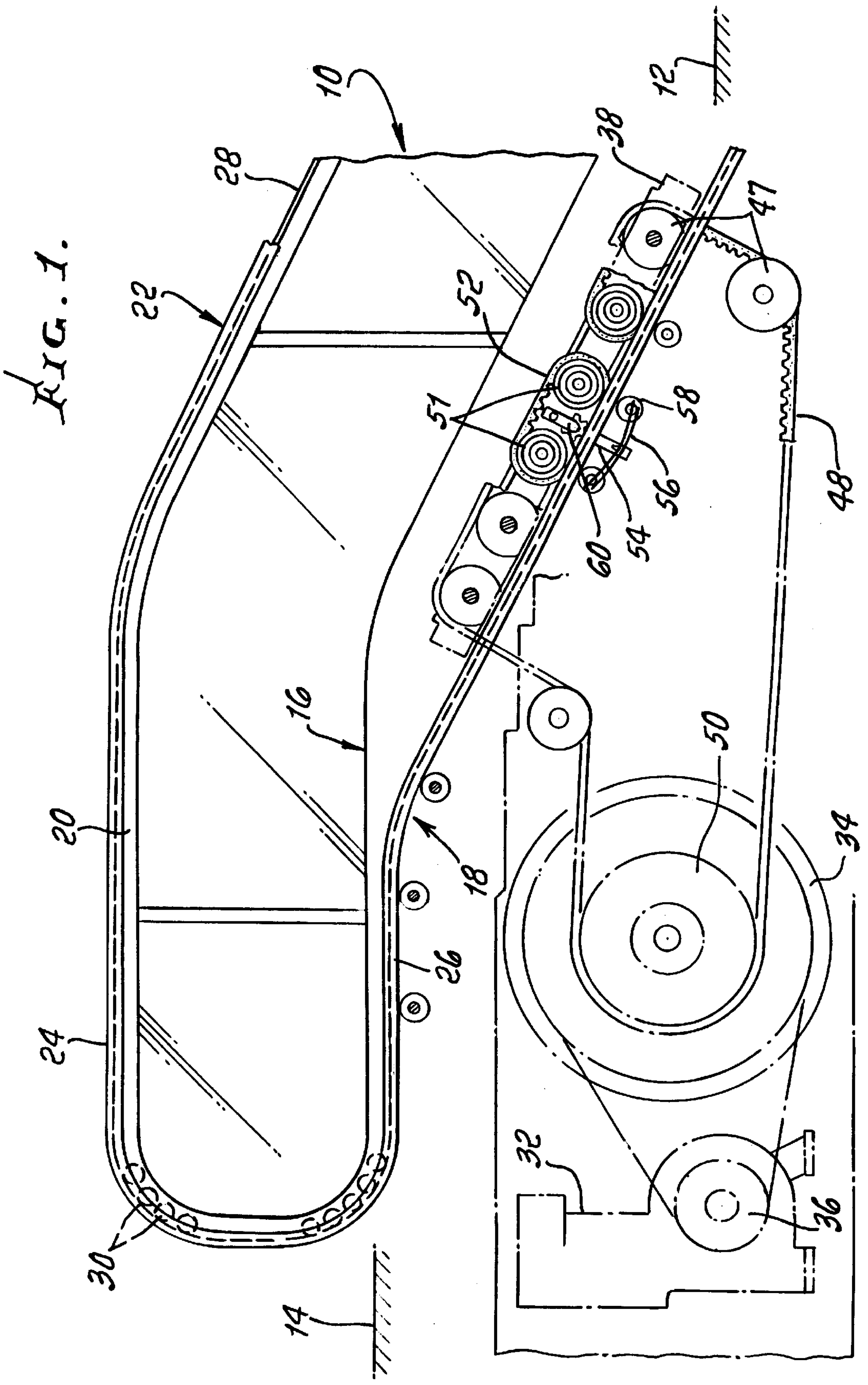
FIG. 1 is a side view, in partial break away, showing the novel escalator hand rail mechanism.
Figure 2:
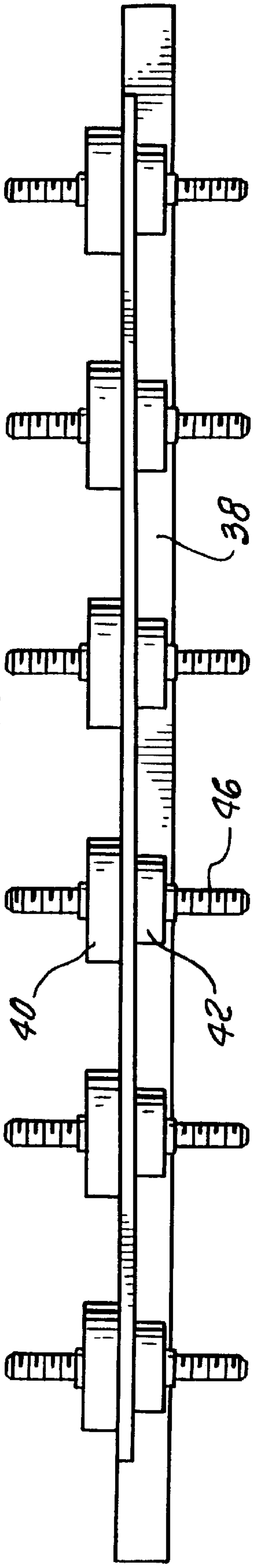
FIG. 2 is a top view of the channel member forming part of the handrail drive mechanism of this invention.
Figure 3:
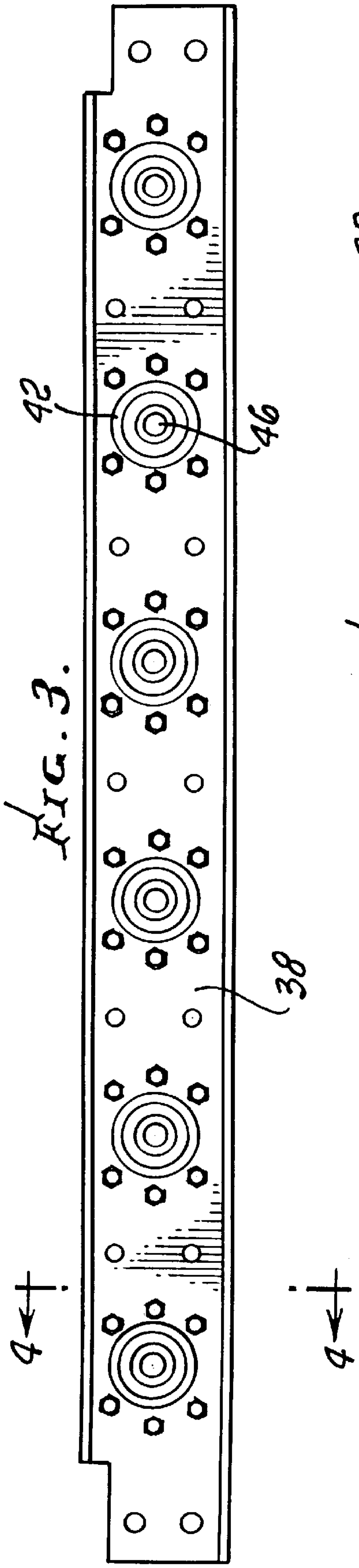
FIG. 3 is a side view of the channel member of FIG. 2.
Figure 4:
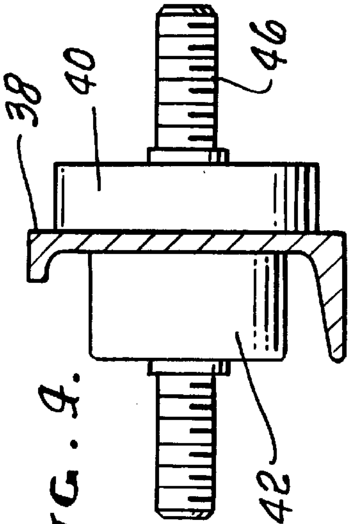
FIG. 4 is a section along the line 4—4 in FIG. 3.
Figure 5:
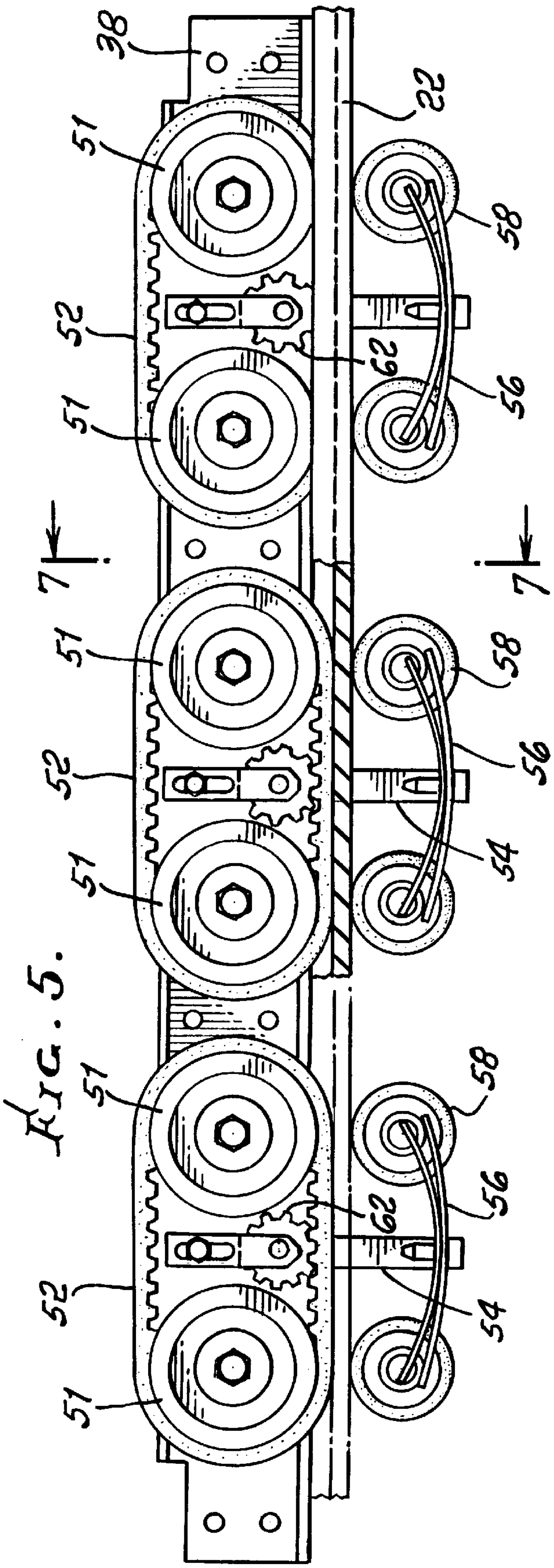
FIG. 5 is an enlarged side view of the novel elevator drive mechanism, in partial break away.
Figure 6:
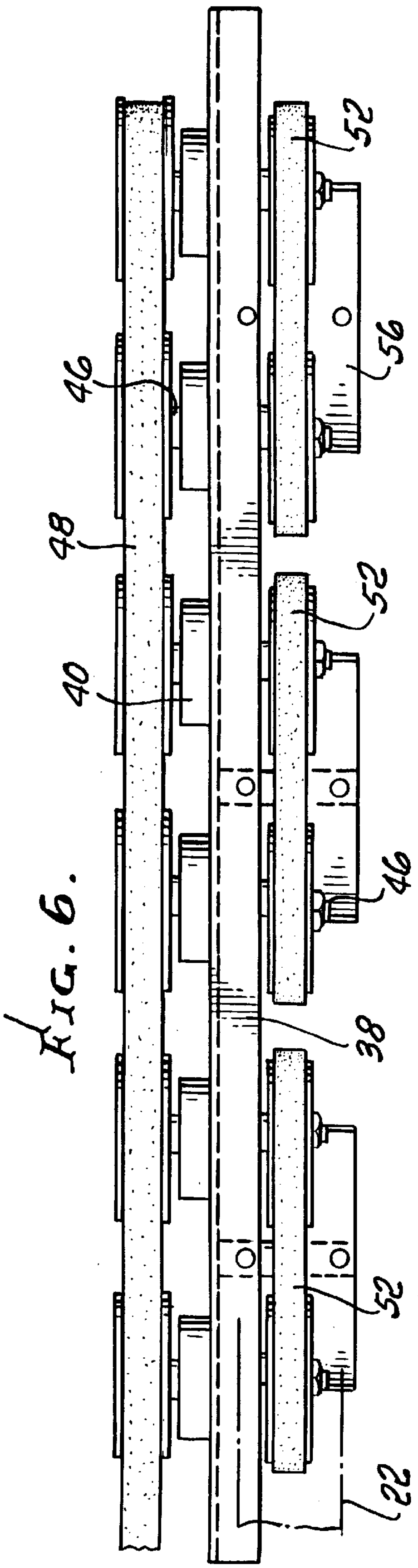
FIG. 6 is a top view of the mechanism of FIG. 5.

Referring to the drawings, FIG. 1 shows a transportation device employing a conveyor 10 for transporting passengers between a first landing 12 and a second landing 14. The conveyor 10 desirably may be of the endless type conventionally employed in moving stairways or in moving walks. In the preferred embodiment, as shown in the drawings, the conveyor 10 is employed in a moving stairway, that is, an escalator. The conveyor 10 has an upper load run 16 in the form of foot pieces on which passengers stand while being transported between the landings and a lower return run 18.

Above the conveyor 10 a balustrade 20 is disposed for guiding a handrail 22. The handrail 22 has an upper run 24 positioned to be grasped by passengers as they are transported along the conveyor 10. The handrail has a lower return run 26.

Figure 7:
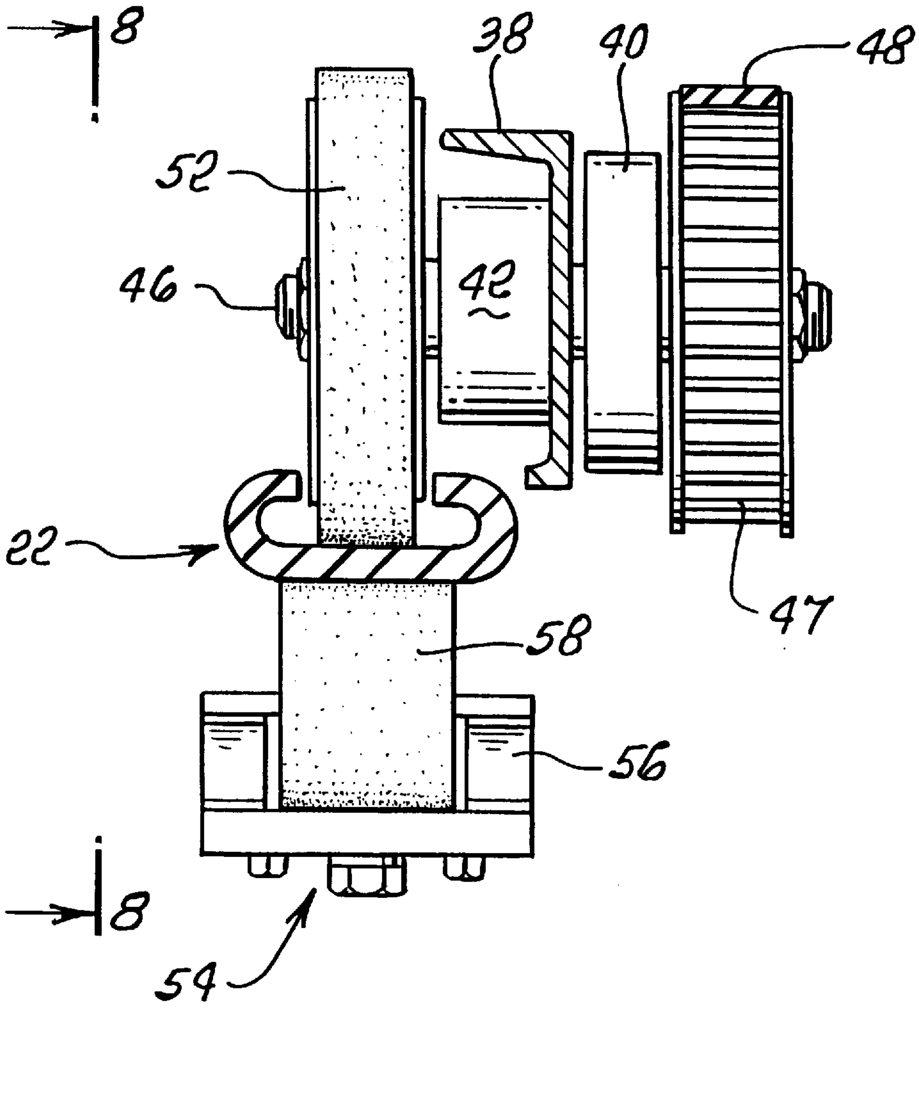
FIG. 7 is a sectional view taken along line 7—7 in FIG. 5.
Figure 8:
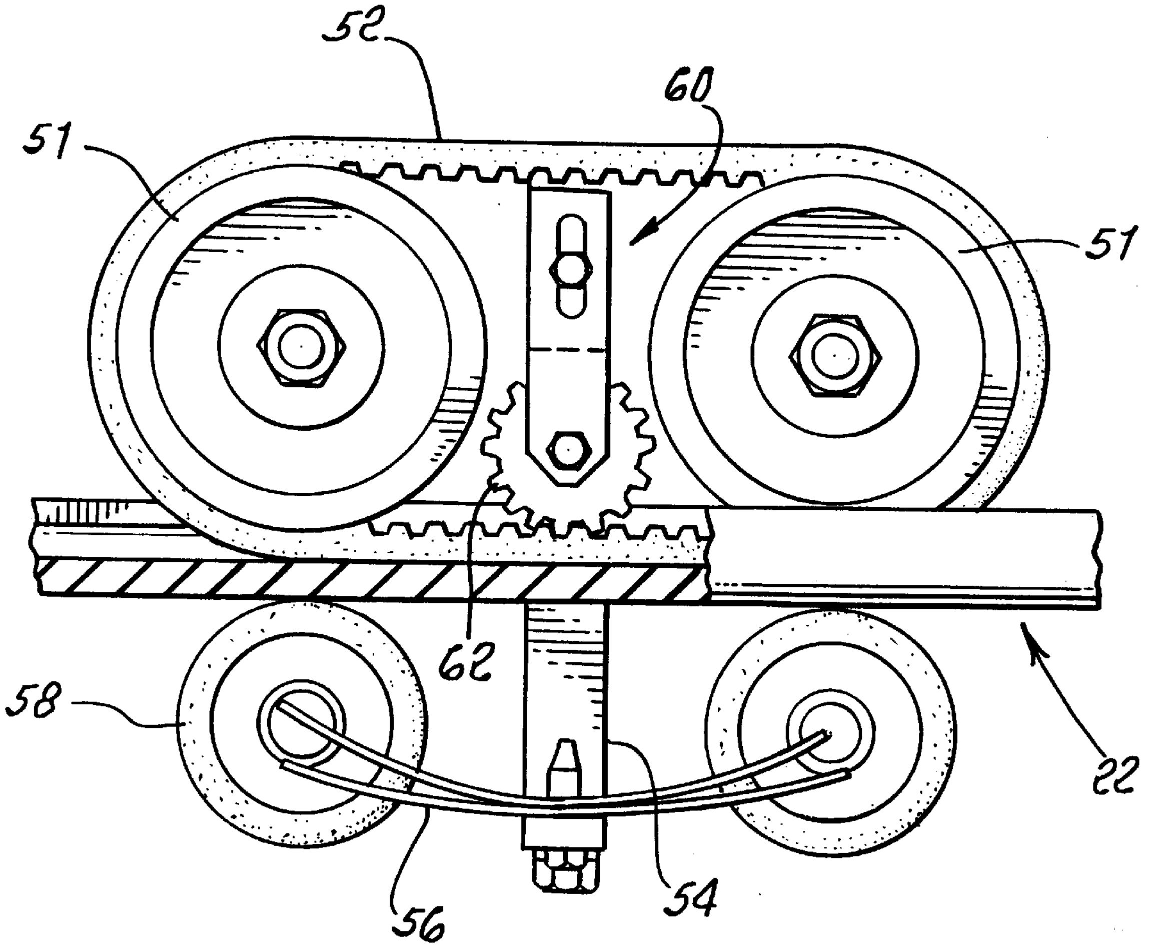
FIG. 8 is an end and partial section taken from the plane of line 8—8 in FIG. 7.

The handrail 22 may be of the conventional flexible construction having a C-shaped cross section as shown in FIG. 7. The handrail 22 generally is constructed as an elongated strip and its ends thereafter are joined to produce an endless or a closed loop.

The balustrade 20 is preferably of the transparent type and the handrail 22 is guided around the balustrade 20 in a conventional manner. Thus, as shown in FIG. 1, a conventional T-shaped guide 28 is located within the cross section of the handrail 22 to serve as a guide means. Because of the increased friction presented to movement of the guide rail a round the ends of the balustrade 20, it is common practice to replace the guide 28 by guide rollers 30 at these ends. The motive force is provided by electric drive motor 32 which rotates outer sprocket wheel 34 through suitable drive mechanism 36.

To this point, the description relates to the generally structure of known escalators and moving sidewalks.

Turning to the novel structures which obviate the problem of handrail slippage with respect to the foot pieces, the handrail drive mechanism is generally supported by a heavy steel channel member 38 which is firmly secured to the main fixed structure of the escalator or moving sidewalk.

Bearing housings 40 and 42 are bolted to channel member 38 by bolts 44. The housings 40 and 42 carry a thru shaft 46. On one side of channel member 38, are carried drive gears 47. The gears 47 are driven by a chain or timing belt 48 which passes over inner sprocket 50. Inner sprocket 50 and outer sprocket 34 are fixedly attached together and are driven by drive motor 32. On the opposite side of the channel member 38 there are pairs of timing gears 51. Around each pair of timing gears 51 are carried timing belts 52. The inside of escalator handrail 22 passes between and in flush contact with belts 52. As the paired gears 50 and associated belt 52 move, the handrail 22 is urged along. Two structures serve to keep the belts 52 in pressure contact with handrail 22.

First, there is a mounting 54 which is bolted at its upper end to channel member 38. At the lower distal end of mounting 54 is carried, by a central connection, a leaf spring 56. Leaf spring 56 carries at each of its free ends rotatable pallet rollers 58. The leaf spring 56 biases the pallet rollers 58 against the handrail 22 which increases contact between the handrail 22 and belts 52 at points directly opposite the points at which gears 51 press on the opposite side of the handpiece, on the belts 52.

Secondly, there is an adjustable idler gear assembly 60 which is positioned between, normally mid-way, the pairs of timing gears 51. The idler gear assembly 60 at one end is adjustably bolted to channel member 38. At the other end, idler gear assembly carries a rotatable idler gear 62 which engages timing belt 52 and keep timing belt 52 in contact with handrail 22.

The overall effect is that contact between the timing belt 52 and the handrail 22 is maintained by the pallet rollers 58 on one side of the handrail 22, and by the idler gear 62 on the opposite side. The increased area of contact afforded by timing belt 52 and the pressure of the pallet rollers 58 cooperate to prevent the handrail 22 from slipping on the return run and thereby eliminates undesirable and dangerous relative positional displacement occurring between the handrail and the foot pieces. The structure described generally keeps essentially all of the surface of the belts 52 between the pairs of gears 51 adjacent handrail 38 in flush abutting pressure contact with the inside surface of the handrail. The belt 52 is quite effective in driving the handrail without slippage between these elements.

It is to be understood that many variations are possible. For example, the timing belts 52 and idler gear 62 need not have teeth. Smooth belts and idler gears will also work provided sufficient pressure and tension are maintained.

Having fully described the invention, it is intended that it be limited only by the lawful scope of the appended claims.

I claim:

1. In a device for transporting persons between spaced landings, an upper load run on which passengers stand and a lower return load run, an endless, flexible handrail, a supporting structure for guiding the handrail in a closed elongated loop, said handrail having an upper run with an outer surface to be grasped by persons to operate as a balustrade and a low return run, and driving means for applying a separate force between the handrail and the structure acting substantially in the same direction at each of a plurality of points spaced between the ends of the loop along the return run of the handrail in the direction of movement of the return run;

the improvement wherein said driving means comprises a plurality of pairs of timing gears spaced along the return run, each of said pairs of timing gears being closely spaced and having a timing belt loop running therebetween, said timing gears having teeth interfitting with said timing belt, means mounting each of said timing gears relative to the structure for rotation about a separate axis extending transverse to the direction of movement of the handrail, each said timing belt loops having a portion of its periphery positioned for flush engagement with a first surface of the handrail, each of the drive gears forming a pair accommodating a single rotatable idler gear to keep pressure between said timing belt loop and said handrail to prevent slippage between the handrail and said drive means, means biasing the opposite surface of the handrail to urge the handrail against the timing belt loop, and coupling means mechanically coupling the timing gears together for rotation, said coupling means including driving means coupled to at least one of said timing gears for rotating the pairs of drive rollers to move the handrail.

2. The device of claim 1 wherein said means biasing comprises a leaf spring which depends from said structure, said leaf spring having free ends, each of which carry a pallet roller which maintain pressure against the surface of said handrail and prevent slippage between the handrail and said drive means.

3. The device of claim 1 wherein said means for mounting said timing gears include shafts, said shafts being carried by bearing housings which are bolted to said structure.

* * * * *